(12) United States Patent
Miettinen

(10) Patent No.: US 7,924,583 B2
(45) Date of Patent: Apr. 12, 2011

(54) METHOD AND ARRANGEMENT IN CONNECTION WITH INVERTER

(75) Inventor: Erkki Miettinen, Kokemäki (FI)

(73) Assignee: ABB Oy, Helsinki (FI)

(*) Notice: Subject to any disclaimer, the term of this patent is extended or adjusted under 35 U.S.C. 154(b) by 510 days.

(21) Appl. No.: 12/068,339

(22) Filed: Feb. 5, 2008

(65) Prior Publication Data

US 2008/0205097 A1    Aug. 28, 2008

(30) Foreign Application Priority Data

Feb. 6, 2007    (FI) ..................................... 20075078

(51) Int. Cl.
*H02M 7/00* (2006.01)
(52) U.S. Cl. .......................................... 363/65; 363/71
(58) Field of Classification Search .................. 363/65, 363/71, 72, 35, 98, 132
See application file for complete search history.

(56) References Cited

U.S. PATENT DOCUMENTS

| 5,460,244 A | 10/1995 | Tanahashi |
| 6,014,497 A * | 1/2000 | Kerkman et al. .............. 388/811 |
| 7,138,773 B2 * | 11/2006 | Kumar ..................... 318/400.27 |

FOREIGN PATENT DOCUMENTS

| JP | 3-23180 A | 1/1991 |
| JP | 2003-209943 A | 7/2003 |
| JP | 2005-328637 A | 11/2005 |

* cited by examiner

*Primary Examiner* — Jessica Han
(74) *Attorney, Agent, or Firm* — Buchanan Ingersoll & Rooney PC

(57) ABSTRACT

A method and an arrangement for controlling an inverter provided with a voltage intermediate circuit, the inverter (1) comprising two or more sub-inverters (1A, 1B, 1C), each being connected with a specific cable to feed a common load (2) and each sub-inverter (1A, 1B, 1C) receiving the same switch instruction pattern. The method comprises the steps of determining the magnitude of a time delay, and consecutively generating, with each sub-inverter (1A, 1B, 1C), an output voltage according to the switch instruction for the load (2) such that each sub-inverter generates an output voltage according to the switch instruction after a time equal to the time delay.

12 Claims, 3 Drawing Sheets

Reference Symbol Legend:

1 - Inverter
1A - Sub-inverter
1B - Sub-inverter
1C - Sub-inverter

2 - Load
3 - Control Part

METHOD AND ARRANGEMENT IN CONNECTION WITH INVERTER

BACKGROUND OF THE INVENTION

The invention relates to a method and an arrangement in connection with an inverter. The invention relates particularly to controlling an inverter consisting of a plurality of sub-inverters, each being connected by a specific cable to feed a common load.

The power stages of power inverters intended for the low-voltage range are usually composed of a plurality of parallel IGBT switch modules. Conventionally, the parallel connection is performed phase-specifically by rigidly interconnecting the switch module poles intended for feeding the same phase in the immediate vicinity of the modules, and by connecting the motor cable conductors of the same phase to said interconnection by means of suitable busbar arrangements.

However, this procedure has a plurality of generally known drawbacks. In order for the phase current to be divided evenly between the rigidly parallel-connected switch module branches, the modules have to be selected to be as similar as possible relative to the voltage loss of the IGBT switches. This increases costs and complicates spare part service. However, matching the voltage loss of the IGBT switches does not usually mean that the voltage losses of the diodes parallel to the switches would be correspondingly matched; instead, extremely significant differences may exist, which may lead to some diodes being overheated.

Each parallel-connected IGBT module has a specific rise time and fall time, which cannot be matched when the voltage losses of the switches are matched. This may cause situations wherein the fastest module switches on the entire phase current and, correspondingly, the slowest module switches off the entire phase current. This results in a serious increase in switching losses and heating at these modules.

As components comprising three switch branches (six-pack) are generally used in the parallel connection of phase modules, each of the branches being composed of e.g. three IGBT chips parallel-connected inside the module, a situation may arise even at average powers wherein there are 9 to 12 rigidly parallel-connected chips. A generally used technique is to indicate any breakthrough of a phase branch by measuring the saturation voltage, i.e. the voltage of either the lower or the upper IGBT chip array against the minus or, correspondingly, the plus busbar. However, this technique does not work if there are many parallel-connected chips, since the short-circuit current of a defectively working chip is known not to be sufficient to draw correctly working chips off saturation; instead, the defectively working module explodes.

Attempts are known to have been made to prevent the above problems with a switch module-specific output inductor, wherein the switch components are connected in parallel after the output inductor. However, such inductors are bulky, they cause much dissipation power and are expensive.

A rigid parallel connection also means that at high powers more than two parallel-connected motor cable phase conductors may be required. This is not possible in the electrical safety prescriptions of several countries without a special permit; instead, in most cases, the requirement is that each of the rigidly interconnected sub-conductors, too, is protected against short-circuit and overload current either with a fuse, a relay function or current measurement. In some cases, this is required at both ends of the cable. These protective components are often expensive and require much space.

The above-described problem of parallel connection is known to have been minimized by connecting each of the parallel-operating three-phase frequency converters with a specific cable directly to the motor in such a manner that the corresponding phases of the parallel frequency converters are not connected until at the motor conduit box. Such a solution allows all the above-described parallel operation problems to be solved, provided that the output currents of each converter are measured and used for protecting the motor cables against short-circuit and overload.

However, the latter method does not either eliminate the disadvantage that may result from the extremely fast IGBT switches switching their states in the coils and bearings of the motors. Because of the switching, a surge wave typically propagates to the coil, the rate of change of the leading edge of the wave being several kilovolts per microsecond. In addition, the reflection phenomenon caused by the discontinuity point generated by the unequal wave impedances of the cables and the motor may, in the worst case, almost double the current peak appearing in the motor poles compared with the voltage level of the intermediate circuit outgoing from the inverter. Such a voltage steepness and large amplitude are known to cause such high turn voltages, particularly in unfavorably coiled wire coils, that there exists the possibility of a partial discharge. An extendedly acting partial discharge may finally damage the insulation of the winding wire, and the resulting turn short-circuit destroys the coil.

The surge wave propagating in the motor cables also causes capacitive polyphase currents via the ground potential, which puncture the lubricant membrane when passing through the motor bearings, thus shortening their service life.

Conventionally, the steepness of the edge of the surge wave caused by the IGBT output stage is lowered by using either output inductors or a specific LC output filter. However, these components are bulky and expensive.

BRIEF DESCRIPTION OF THE INVENTION

It is the object of the invention to provide a method and an arrangement for implementing the method in a manner solving the above-mentioned partial discharge and bearing current problems. The object of the invention is achieved with a method and an arrangement, which are characterized in what is stated in the independent claims. The preferred embodiments of the invention are disclosed in the dependent claims.

The invention is based on generating voltage for a load with parallel sub-inverters in such a manner that the sub-inverters generate the same output voltage pattern, but, however, with mutually slightly delayed switchings. Cables, parallel-connected to the load only at their tail ends, implement, by means of their wave impedances, the voltage division acting in the motor poles at the time of the switching, enabling a gradual increase in the voltage of the load.

Since the coupling time of an individual sub-inverter remains the same in the arrangement of the invention, but the voltage increment taking place in the motor poles is lower, it means that the rate of voltage rise observed by the load, such as a motor, becomes lower such that the load cannot be damaged under the influence of the rate of voltage rise. The rate of voltage rise can also be lowered without separate components, such as inductors or filters, to be added to the output of the inverter.

BRIEF DESCRIPTION OF THE FIGURES

In the following, the invention will be described in more detail in connection with preferred embodiments with reference to the accompanying drawings, in which.

DETAILED DESCRIPTION OF THE INVENTION

Figure 1:
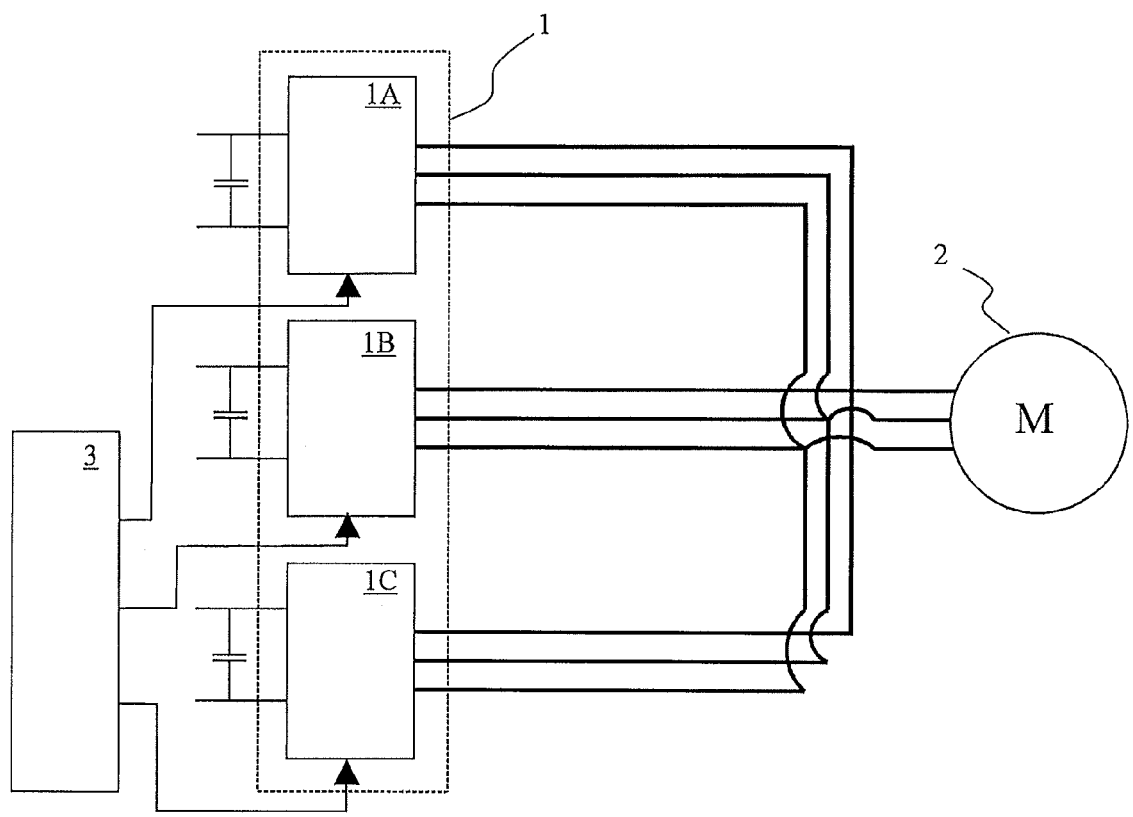
FIG. 1 shows an inverter composed of three sub-inverters and the cabling thereof to a load.

FIG. 1 shows the principle of sub-inverters 1A, 1B, 1C operating in parallel and together constituting an inverter 1, which is controlled to generate the desired voltage for a load 2. In the present description, a load refers to a motor, but it is clear, however, that the type of load bears no significance to the application of the invention.

The sub-inverters operating in parallel are connected to the load, each with a specific cable, and these sub-inverter cables are interconnected at the motor end and further connected to the load. The interconnection of the cables is naturally performed by interconnecting the corresponding phases of each cable. FIG. 1 shows this cable connection before the load in order to increase clarity. In real terms, this connection is performed in the motor conduit box or the like by using busbar structures, for example.

FIG. 1 also shows a control part 3 for controlling the inverter and for transmitting switching instructions to each sub-inverter for generating the desired output voltage in a manner known per se. Each parallel sub-inverter 1A, 1B, 1C thus receives the same switching pattern from the control part 3.

In accordance with the method of the invention, the switching pattern of each sub-inverter is delayed in such a manner that the sub-inverters gradually generate the output voltage with the determined, equally spaced time delay. In other words, each sub-inverter implements the switching instruction at a mutually different moment in time.

The magnitude of the time delay is affected mainly by cable length, since the propagation rate of the surge wave with the power cables referred to in this connection is sufficiently accurately the same. The most preferable magnitude of the time delay may be determined either arithmetically by knowing the length of the motor cable or experimentally during the implementation of the inverter and the motor.

However, the magnitude of the time delay cannot be increased freely, but the equalizing currents caused by the switching delays in the parallel cables have to be taken into consideration, since if the phase switch of for instance one sub-inverter is switched to the plus busbar of the intermediate circuit and the switches of the other inverters are still in the minus busbar, a short-circuit current is generated via the cables, the rate of rise of which current is restricted only by the inductance of the cables. Consequently, it is clear that a longer delay can be used with long cables than with short cables.

Typically, the length of the equalizing current peaks caused by the switching delay is only dozens or at most hundreds of nanoseconds, whereby their magnitude bears no significance as regards the load capacity of the cable, but the switching losses of the IGBT modules may increase significantly if the equalizing currents to be switched on and off are high.

When output voltages are generated with the sub-inverters for a common load at intervals of said time delay, the terminal voltage of the load, such as a motor, does not rise by one large step and possibly in a manner damaging the motor coils; instead; the rise is divided into successive steps in accordance with the number of parallel sub-inverters.

The operation of the solution is based on a voltage division generated at the input poles of the motor by the individual motor cables and the motor wave impedances, as a result of which the sum amplitude of the surge wave incoming along an individual cable and the reflection wave generated on top thereof is attenuated the more the more sub-inverters are connected in parallel operation. A surge wave edge having a lower amplitude but the same duration signifies a lower rate of change, which is preferable as regards motor coiling and bearings.

It can be proved that the height of the voltage peak mutually caused by the surge wave incoming along one parallel motor cable and the reflection generated at the discontinuity point between the cables and the motor is the smaller the more parallel frequency converters are connected to feed to the same motor. If the motor wave impedance is $Z_m$ and the cable wave impedance is $Z_k$, then the height of an individual voltage level $u_p$ visible at the motor poles can be determined by equation $$u_p = \frac{2 U_c Z_m}{n Z_m + Z_k}$$

wherein n is the number of parallel cablings and sub-inverters and $U_c$ is the magnitude of the voltage of the intermediate circuit. 200 ohm can be considered a typical value of the motor wave impedance and 50 ohm of the cable wave impedance.

The above equation thus presents the magnitude of the voltage level that the switching of an individual sub-inverter may cause taken into consideration the interaction of the discontinuity point of the cable and motor impedances and the voltage division. Correspondingly, the total voltage peak $u_{max}$ acting in the motor poles is $u_{max} = n u_p$.

The motor polar voltage thus rises gradually, at intervals of the determined delay towards the voltage of the intermediate circuit. The number of voltage levels corresponds directly to the number of sub-inverters, whereby, for instance when three sub-inverters are feeding the same load, the voltage rises in three steps to the magnitude of the voltage of the intermediate circuit. Similarly, the magnitude of the voltage level generated is the smaller the larger the number of sub-inverters the inverter is composed of is.

Figure 2:
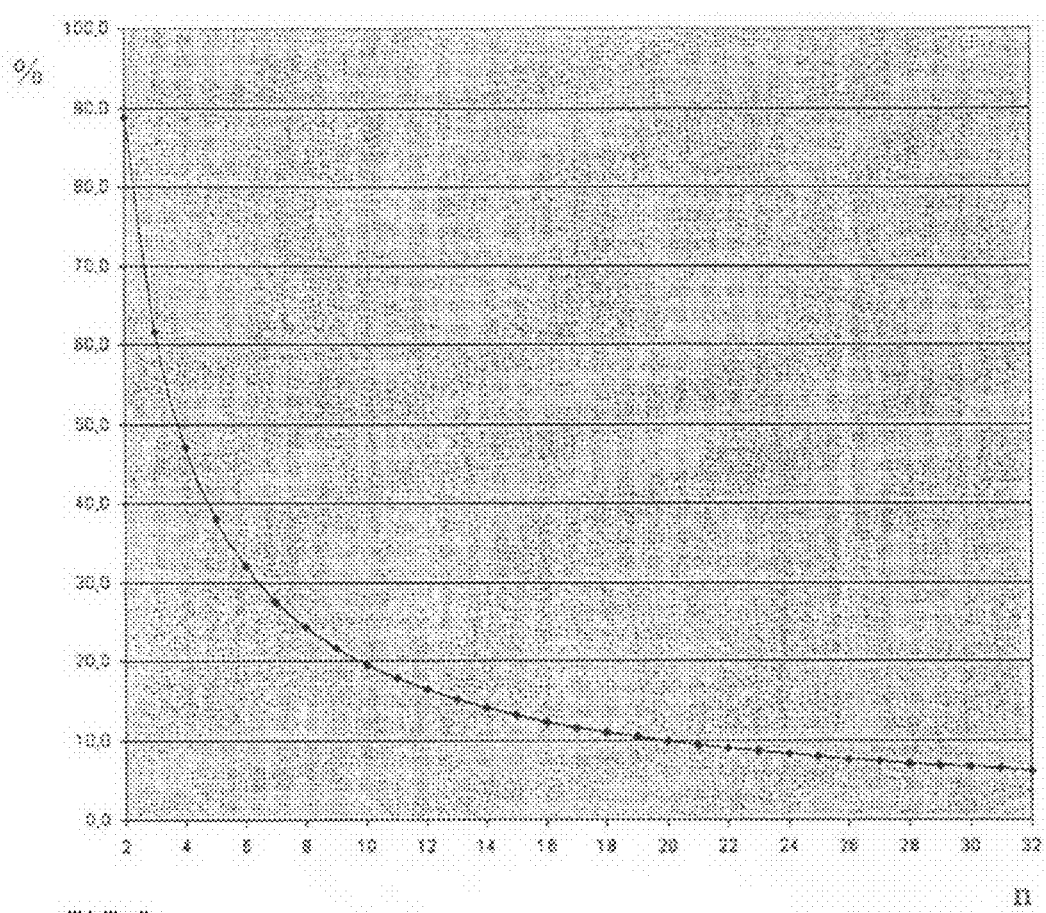
FIG. 2 shows an example of the percent proportion of the voltage level acting in the inputs of a motor as a function of the number of inverters parallel-cabled from the intermediate circuit voltage.

FIG. 2 graphically shows the decrease in the maximal voltage pulse as a function of the number of parallel sub-inverters that are controlled optimally delayed. The percent proportion shown in FIG. 2 reflects the percent proportion of the voltage level of the voltage of the intermediate circuit in accordance with the above equation. As was mentioned previously, said equation also accounts for the effect of the reflection voltage generated at the discontinuity point of the wave impedances of the motor and the cable.

Accordingly, in accordance with the invention, it is preferable to divide the feed of one high-power motor between a plurality of parallel power stages connected to the motor with a specific motor cable and controlled optimally delayed, since, in accordance with FIG. 2, the surge voltage increment visible in the motor poles is attenuated to less than half of the intermediate circuit voltage, for example, if the number of power stages is four. Such a decreased voltage level is typically no longer capable of generating a partial discharge in a 690-volt low-voltage winding, since the theoretical magnitude of the voltage required for a partial discharge is about 350 volts, the practical minimum value being about 450 volts.

Figure 3A:
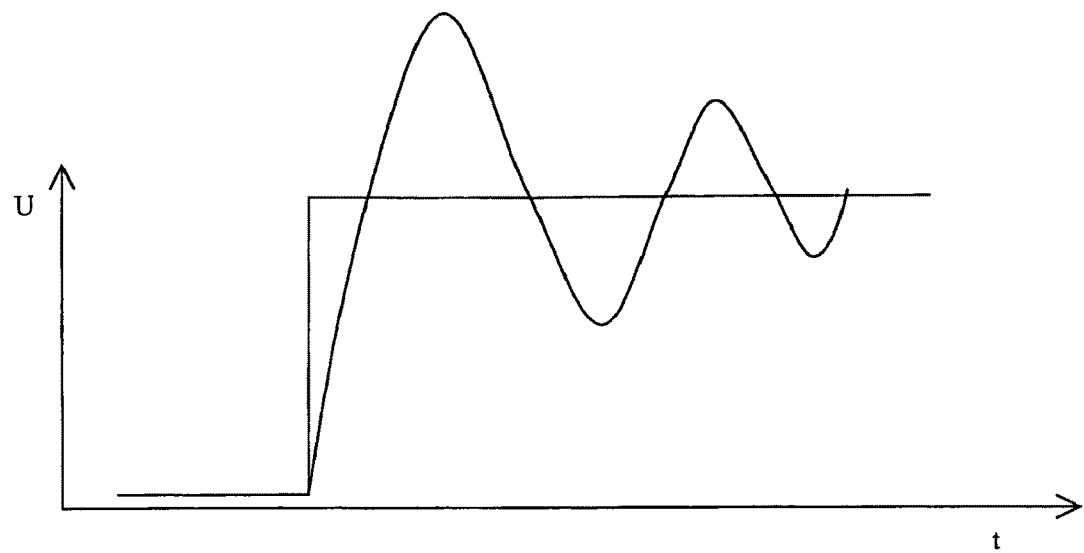
FIG. 3A shows an example of the voltage oscillation generated by the prior art.
Figure 3B:
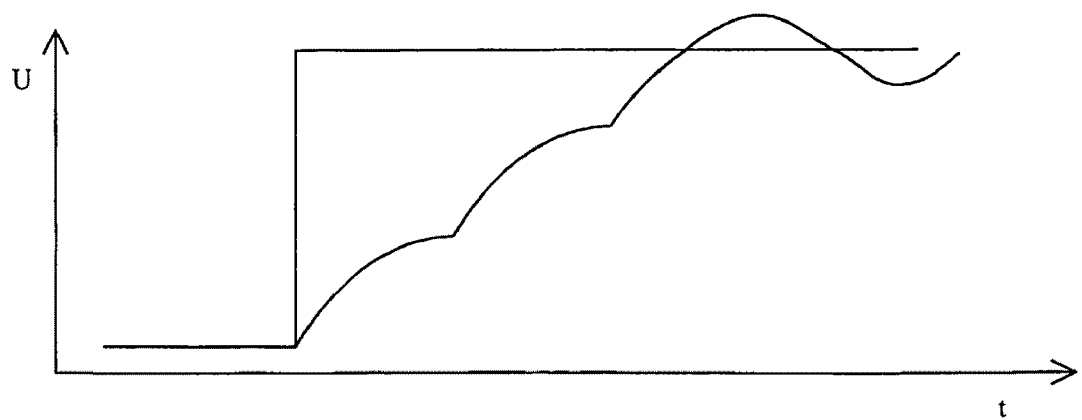
FIG. 3B shows an example of a voltage curve form achieved by the method of the invention at the motor poles.

FIG. 3A shows the principle of the curve form of the voltage in the motor poles when a single pulse of the magnitude of the intermediate circuit voltage is switched to the motor in a known manner. FIG. 3B, in turn, shows a principled curve form achieved by the method of the invention. The curve form of FIG. 3B is generated with an inverter comprising three delayed-controlled sub-inverters, and thus the curve is composed of three consecutive steps, the time difference between which is of the magnitude of the determined and employed delay.

In accordance with an embodiment of the invention, the control part 3 shown in FIG. 1 transmits instructions to the sub-inverters at intervals of a successively determined delay. This being the case, the sub-inverter implements the voltage instruction immediately upon receipt thereof. The delay may be generated in the control part in a manner known per se. The delay may also be implemented in each sub-inverter, whereby each sub-inverter receives the voltage instruction simultaneously, but each of them implements the voltage instruction received only after a time determined by a preset set of delays in order to achieve graduality. Of these embodiments, the first is simpler to implement, and it simultaneously enables easier adaptation of the inverter by removing any damaged sub-inverters, which lowers the capacity of the inverter, but allows its use to be continued.

FIG. 1 only shows sub-inverters 1A, 1B, 1C of the inverter 1, and capacitors connected to the input side thereof. Typically, inverters generate their output voltage from the direct-current voltage of the intermediate circuit. This direct-current voltage may be generated for the sub-inverters with one or more rectifiers. The direct-current voltage intermediate circuit may be common to all sub-inverters, or, correspondingly, the direct-current voltage intermediate circuits may be generated separately for all sub-inverters, whereby the redundancy of the structure generated further increases. It is also feasible that one direct-current voltage circuit is divided among two or more sub-inverters.

The reflection of surge wave edges passing in the cables from the discontinuity points of the impedance level causes reciprocating wave fronts in the cable in a known manner, and by suitably adjusting the phasing of the fronts they can be made to at least partially compensate for each other's effect. Since cable length affects the propagation time consumed by the reflections when passing from one end of the cable to the other, with the cable length known, the most optimal value of the delays between the inversions of the parallel feed cables connected to the input terminals of the motor can be calculated in advance for minimizing the rate of change of the voltage observed by the motor. Furthermore, the optimization of the delay between the sub-inverters feeding the same motor can be performed by experimental measurements in connection with the implementation.

The arrangement according to the invention comprises means for determining or storing the time delay. Thus, the determination may be performed by using the arrangement itself, or it may be set in a device as a parameter on the basis of measurements or statistical data, for example.

Direct measurement of cable length is not always a simple procedure, since cables may pass along complicated routes, and the length is very rarely measured during the installation stage. The speed with which the wave front propagates in the cable is not either always very exactly known. However, the arrangement for implementing the method of the invention enables direct measurement of the time taken up by the voltage wave to pass from the output stage of one frequency converter to the output stage of another frequency converter. The time is the same as that taken up by the to-and-from travel of the reflection passing in the cable.

The measurement of the propagation time of a voltage pulse may be performed for instance by controlling all power stages feeding the same motor, except for one, to a high-impedance output state and simultaneously switching all three phases of said one converter, i.e. implementing a so-called zero vector to the potential of the minus busbar, i.e. 'down', for example. Through the motor, this output polarity is visible in all other output stages, too. When all three phases of said one converter are now inverted 'up', the surge wave generated by the inversion propagates towards the motor and, when reaching its poles, reflects, not only back along its specific cable, but is also transmitted along all other parallel cables to the corresponding power stages. When the wave front reaches the power stages, the exact moment of change in their output state can be transmitted to said one frequency converter. Knowing the data transmission delay between the converters, which is in the order of 15 ns, it is able to determine the time taken up by the wave front for travelling the distance equal to double the length of the motor cable. A switching of this kind can be implemented several times in both directions, whereby the effect of random errors decreases owing to averaging.

The control part of the inverter is thus able to receive the time determined and to use said time further for determining the delay between the different inverters. The magnitude of the time delay may be determined from the propagation time either as a given percent portion or by subtracting a given motor-specific constant time from the propagation time. When the propagation time exceeds a given limit, it is also possible to use a given constant value as the magnitude of the delay.

The magnitude of the total time delay used is low enough, typically at most 300 ns, not to be able to interfere with the normal control of the inverter, i.e. in spite of the delay, the switch instruction is implemented for each sub-inverter in good time before the reception of the following switch instruction.

The number of parallel sub-inverters is not limited, on the contrary, the solution according to the invention becomes advantageous when a plurality of parallel-connected inverters is used, because the bearings of high-power motors are particularly sensitive to ground circuit currents caused by high rates of voltage change that stress the bearings.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method of controlling an inverter provided with a voltage intermediate circuit, the inverter comprising two or more sub-inverters, each being connected with a specific cable to feed a common load, and each sub-inverter receiving the same switching instruction pattern, the method comprising the steps of:
   determining the magnitude of a time delay; and
   consecutively generating, with each sub-inverter, an output voltage according to the switch instruction for the load such that each sub-inverter consecutively generates an output voltage according to the switch instruction after a time equal to the time delay.

2. A method as claimed in claim 1, wherein the magnitude of the time delay is determined by observing, in the load, a curve form of the voltage generated by the sub-inverters.

3. A method as claimed in claim 1, wherein the determination of the magnitude of the time delay comprises the step of determining a propagation time for a voltage pulse between a sub-inverter and the load.

4. A method as claimed in claim 3, wherein the propagation time of the voltage pulse between a sub-inverter and the load comprises the steps of:
generating the voltage pulse with one sub-inverter;
detecting, in the other sub-inverters, a state change caused by the voltage pulse generated; and
determining the time between the generation of the voltage pulse and the detection of the state change caused thereby.

5. A method as claimed in claim 4, wherein the voltage pulse to be generated is a zero vector.

6. A method as claimed in claim 1, wherein the determination of the magnitude of the time delay comprises the step of determining the length of a cable between a sub-inverter and the load.

7. A method as claimed in claim 1, wherein the consecutive generation of the output voltage with each sub-inverter comprises the step of each sub-inverter receiving a switch instruction after a time equal to the time delay.

8. A method as claimed in claim 1, wherein the consecutive generation of the output voltage with each sub-inverter comprises the step of each sub-inverter receiving a switch instruction simultaneously and waiting for the duration of the time delay or a delay equal to a multiple thereof before implementing the switch instruction.

9. A method as claimed in claim 1, wherein the consecutive generation of the output voltage with each sub-inverter comprises the step of each sub-inverter implementing the switching instruction at a mutually different moment in time such that the sub-inverters respectively wait the time equal to the time delay to respectively generate the output voltage in succession.

10. An arrangement for controlling an inverter, the inverter comprising two or more sub-inverters, each being connected with a specific cable to feed a common load, and each sub-inverter receiving a same switch instruction, the arrangement comprising:
means for determining or receiving the magnitude of a time delay; and
means for consecutively generating an output voltage according to the switch instruction with each sub-inverter such that an output voltage according to the switch instruction is consecutively generated with each sub-inverter at intervals equal to the time delay.

11. An arrangement as claimed in claim 10, wherein the inverter further comprises delay means arranged to delay switch instructions to be transmitted to each sub-inverter.

12. An arrangement as claimed in claim 10, wherein the means for consecutively generating an output voltage according to the switch instruction comprises means for implementing the switching instruction at a mutually different moment in time between the sub-inverters such that each sub-inverter respectively waits for a time equal to the time delay to respectively generate the output voltage in succession.

* * * * *